United States Patent
Eilat et al.

(10) Patent No.: US 10,164,849 B2
(45) Date of Patent: Dec. 25, 2018

(54) TECHNIQUES TO DETECT FOREGROUND PROCESSES

(71) Applicant: Facebook, Inc., Menlo Park, CA (US)

(72) Inventors: Roee Eilat, Tel Aviv (IL); Omri Gindi, Tel Aviv (IL)

(73) Assignee: FACEBOOK, INC., Menlo Park, CA (US)

(*) Notice: Subject to any disclaimer, the term of this patent is extended or adjusted under 35 U.S.C. 154(b) by 332 days.

(21) Appl. No.: 14/974,167

(22) Filed: Dec. 18, 2015

(65) Prior Publication Data

US 2017/0180222 A1  Jun. 22, 2017

(51) Int. Cl.
*H04L 12/26* (2006.01)
*H04L 29/08* (2006.01)
*H04W 88/02* (2009.01)

(52) U.S. Cl.
CPC ............ *H04L 43/08* (2013.01); *H04L 43/045* (2013.01); *H04L 43/14* (2013.01); *H04L 67/142* (2013.01); *H04W 88/02* (2013.01)

(58) Field of Classification Search
CPC ..... H04L 43/08; H04L 43/045; H04L 67/142; H04L 43/14; H04W 88/02
USPC ........................................................ 709/224
See application file for complete search history.

(56) References Cited

U.S. PATENT DOCUMENTS

| | | | | |
|---|---|---|---|---|
| 7,421,696 B2* | 9/2008 | Bowie-Britton | ....... | G06Q 10/10 707/999.1 |
| 9,269,355 B1* | 2/2016 | Secker-Walker | ....... | G10L 15/30 |
| 2013/0227419 A1* | 8/2013 | Lee | .......................... | G06F 9/48 715/728 |
| 2016/0063828 A1* | 3/2016 | Moussette | ................ | G08B 6/00 340/540 |

* cited by examiner

Primary Examiner — Tu T Nguyen

(57) ABSTRACT

Techniques to detect foreground processes are described. In one embodiment, for example, an apparatus may comprise a client data reception component operative to receive a series of active process lists from a plurality of client devices via the networking interface controller on the server device; a graph construction component operative to construct a plurality of active process graphs based on the active process lists, wherein each client device is associated with a single active process graph, wherein each node in each of the plurality of active process graphs corresponds to an active process on an associated client device, wherein each pair of connected nodes in each graph corresponds to a concurrence of an associated pair of active processes on an associated client device; and a graph analysis component operative to determine foreground processes based on the constructed active process graphs. Other embodiments are described and claimed.

20 Claims, 10 Drawing Sheets

500

Receive a series of active process lists from a plurality of client devices at a server device.
502

Construct a plurality of active process graphs based on the active process lists, wherein each client device is associated with a single active process graph, wherein each node in each of the plurality of active process graphs corresponds to an active process on an associated client device, wherein each pair of connected nodes in each graph corresponds to a concurrence of an associated pair of active processes on an associated client device.
504

Determine one or more system processes based on identifying completely-connected nodes in the plurality of active process graphs.
506

Calculate a concurrence score for each process based on a ratio between concurrence of each process with at least one other process as compared to occurrence of each process within the plurality of active process graphs.
508

Determine one or more background service processes based on identifying concurrent processes with a higher concurrence score than processes with which the concurrent processes are concurrent.
510

Determine foreground processes based on eliminating the one or more system processes and the one or more background service processes from the active process lists.
512

*FIG. 5*

TECHNIQUES TO DETECT FOREGROUND PROCESSES

BACKGROUND

Mobile devices may run applications, commonly known as "apps," on behalf of their users. These applications may execute as processes on a device. These applications may execute when in the foreground on a device and/or may execute when in the background on a device. Other processes may also execute on the device.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to detect foreground processes. Some embodiments are particularly directed to techniques to generate foreground usage statistics for application on a client device based on the detection of foreground process prioritization. In one embodiment, for example, an apparatus may comprise a client data reception component operative to receive a series of active process lists from a plurality of client devices via the networking interface controller on the server device; a graph construction component operative to construct a plurality of active process graphs based on the active process lists, wherein each client device is associated with a single active process graph, wherein each node in each of the plurality of active process graphs corresponds to an active process on an associated client device, wherein each pair of connected nodes in each graph corresponds to a concurrence of an associated pair of active processes on an associated client device; and a graph analysis component operative to determine foreground processes based on the constructed active process graphs. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

DETAILED DESCRIPTION

Figure 1:
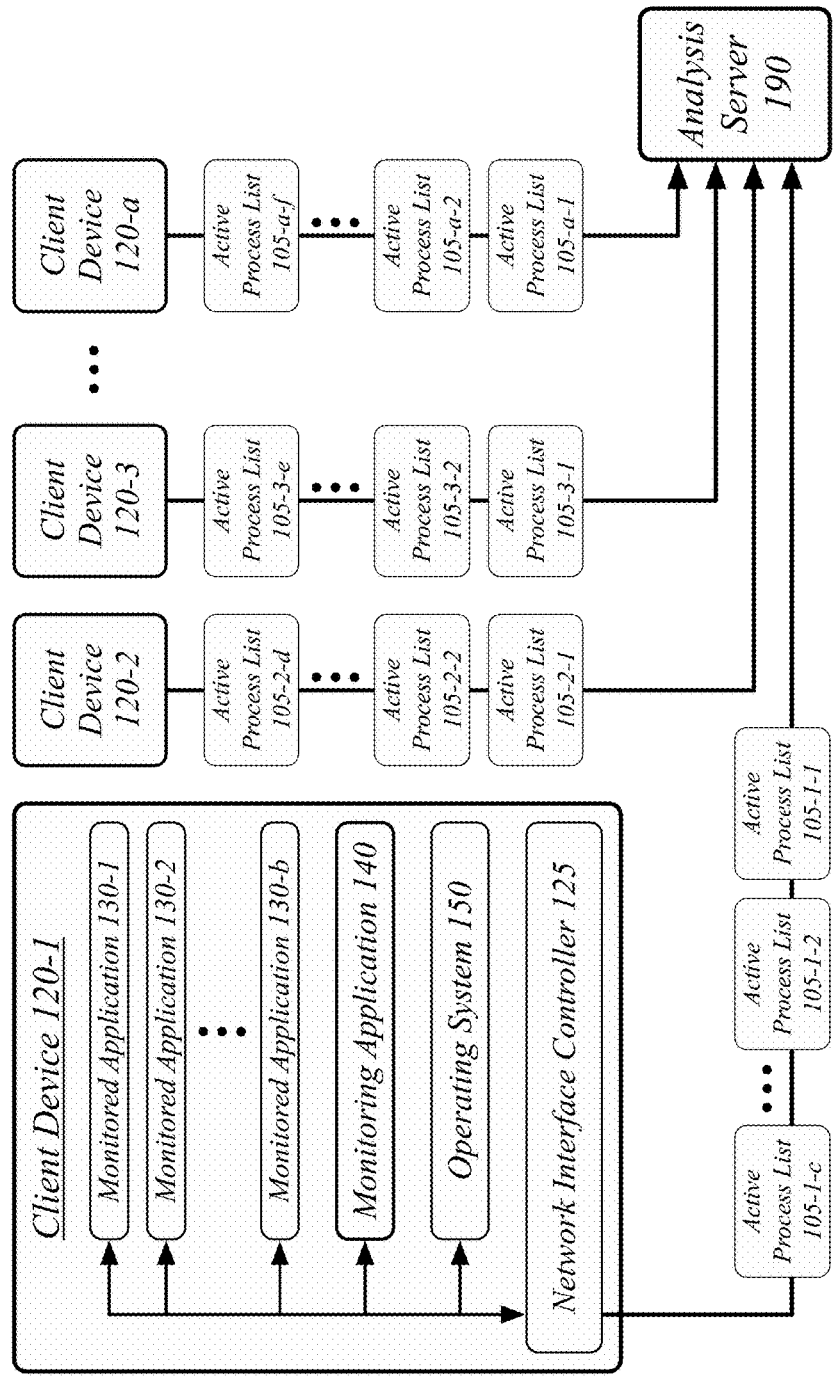
FIG. 1 illustrates an embodiment of a system from a client perspective.

Various embodiments are directed to techniques for determining usage statistics for mobile applications that accurately represent actual application usage. The embodiments may attempt to only represent an application as having been used by a user on a mobile device where the application was used in a foreground state. Mobile application developers, mobile application distributors, mobile advertisers, cellular operators, mobile device and operating system (OS) providers, and other entities involved in the mobile application ecosystem may be interested in how often users actually use the mobile applications on their devices. As application may execute even in the background, measuring where an application is actually executing in the foreground may serve to increase the accuracy of measurements of user engagement with applications.

In some operating environments, a user application may request the identity of the foreground application from an operating system for the device and receive an identifier for the current foreground application. However, some operating systems refrain from providing this information to user applications. Instead, application activity may be detected on a device by requesting a list of active, highly active, important, or other prominent processes on a device. These active processes may include some or all of the processes for the foreground application, one or more background processes providing background services or performing background activities, and one or more system processes that are assigned a high priority, such as system processes for providing cellular or other important hardware access services. As such, it may be beneficial to implement techniques that distinguish between foreground processes, background processes, and system processes to generate application usage statistics.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a foreground application detection system 100. In one embodiment, the foreground application detection system 100 may comprise a computer-implemented system having software applications comprising one or more components. Although the foreground application detection system 100 shown in FIG. 1 has a limited number of elements in a certain topology, it may be appreciated that the foreground application detection system 100 may include more or less elements in alternate topologies as desired for a given implementation.

A client device may correspond to a mobile device, personal computer device, portable computer device, desktop computer device, tablet device, smartphone device, and/or any other form of computing device. A client device may be associated with a particular user and access one or more data networks for use in communication. The foreground application detection system 100 may generate active usage statistics for monitored applications 130 on a plurality of client devices 120. The active usage statistics may be generated based on active process lists 105 received from the client devices 120, wherein each of the client devices 120 transmits a particular plurality of active process lists 105 to an analysis server 190 for analysis of the cumulative total.

A client device may communicate with other devices using wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as a client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 125 may be used for the network activities of the embodiments described herein, including the interoperation of the monitored applications 130, monitoring application 140, and analysis server 190 through network communication. For example, the monitoring application 140 transmitting active process lists 105 to an analysis server 190 may correspond to using the network interface controller 125 for network access to a communications network for the transmission of the active process lists 105.

Monitored applications 130 may correspond to some or all of the applications installed, otherwise stored, or otherwise available for execution on a client device. The monitored applications 130 may include applications included with a client device by the provider of a client device, reseller of a client device, provider of the operating system 150, provider of cellular service to a client device, or other entity configuring a client device prior to distribution to its end user. The monitored applications 130 may include applications installed by a user of a client device. In some cases, a user may have installed one or more of the monitored applications 130 by downloading the applications from an application repository. The operating system 150 may comprise any known operating system, including the iOS® or Android® operating systems.

The monitoring application 140 may be included with a client device or may be installed by a user of a client device. In some embodiments, the monitoring application 140 may be a special-purpose application directed specifically to the monitoring of process activity or, more broadly, application activity, without providing separate functionality to the user of a client device. In some embodiments, the monitoring application 140 may also empower the user to view usage statistics regarding the monitored applications 130 on a client device. In some embodiments, the monitoring application 130 may also provide the user with additional functions, such as messaging, access to a social network, web-browsing, media viewing, media capture, media uploading, or any other functions.

The monitoring application 140 may be operative to monitor the process activity of the monitored applications 130 on a client device. In some embodiments the monitoring application 130 may monitor the process activity of all the applications on a client device, with the monitored applications 130 therefore comprising all of the applications on a client device. In other embodiments the monitoring application 130 may monitor only a portion of the applications on a client device, with the monitored applications 130 therefore comprising that portion of the applications on a client device. The user of a client device may be empowered to select which applications, if any, on a client device the monitoring application 140 is to monitor, with the monitored applications 130 comprising this selected portion of the applications on a client device. The monitoring application 140 may periodically, such as on a regular schedule (e.g., every 100 milliseconds, every 5 seconds), poll the operating system 150 and receive the list of active processes. The monitoring application 140 may generate an active process list after each polling period, or after each change in the list of active processes, and transmit it to the analysis server 190. Alternatively, a plurality of active process lists may be generated and queued and transmitted to the analysis server 190 in a batch.

The monitoring application 140 may generate active process lists 105 representing snapshots of the currently active or important processes executing on a client device. The monitoring application 140 may transmit active process lists 105 to an analysis server 190. The analysis server 190 may be operative to receive the active process lists 105 and to generate active usage statistics for a plurality of client devices 120. The analysis server 190 may provide the statistics to the user of a client device, such as via the monitoring application 140. The analysis server 190 may additionally or alternatively provide the statistics to other entities. The providing of the statistics to other entities may be controlled according to privacy policies explicitly accepted by the user of a client device prior to any monitoring of network usage or collecting of network usage information.

Figure 2:
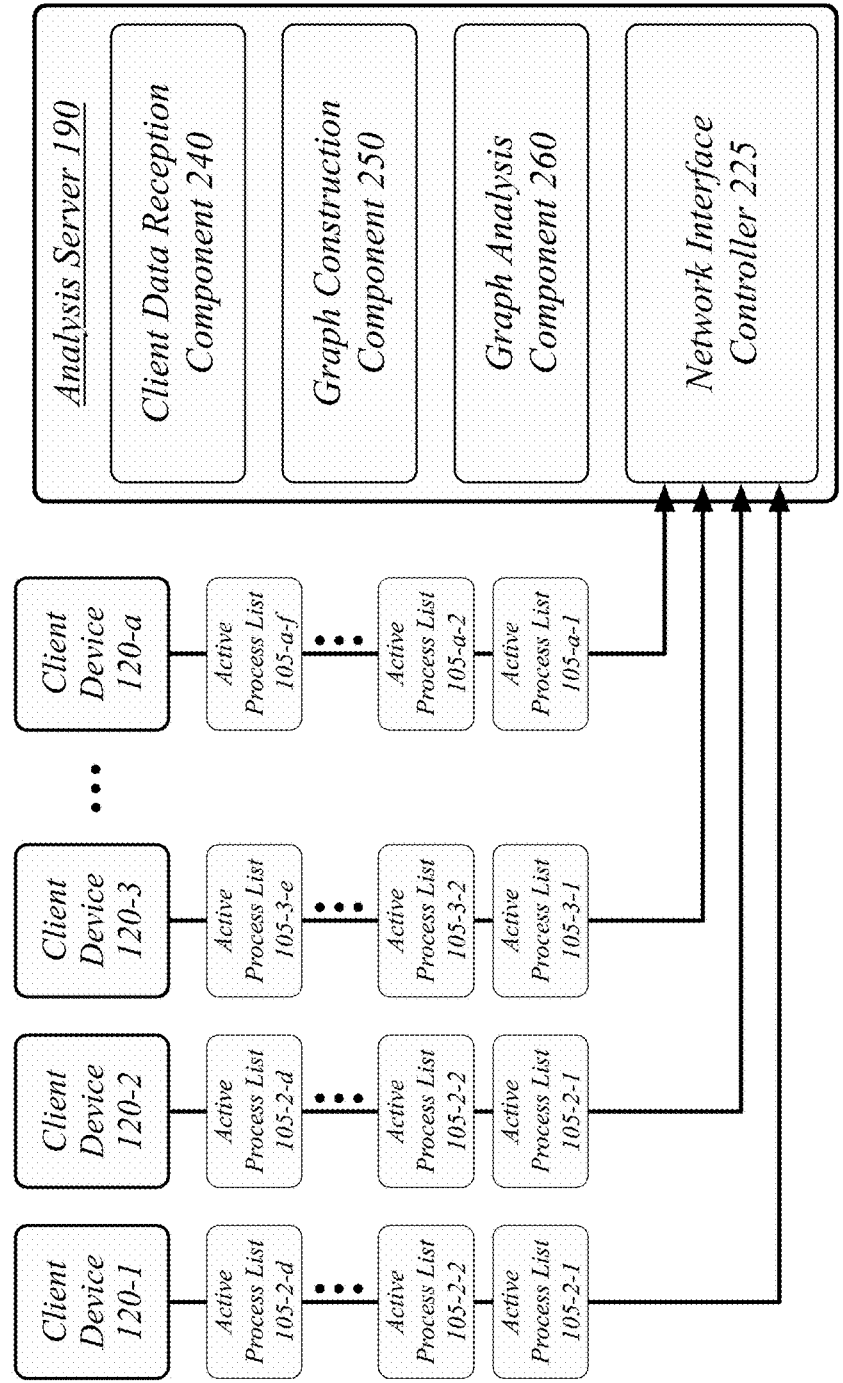
FIG. 2 illustrates an embodiment of a system from a server perspective.

FIG. 2 illustrates an embodiment of a foreground application detection system 100 from a server perspective.

An analysis server 190 may receive a plurality of active process lists 105 from a plurality of client devices 120. The analysis server 190 may comprise a network interface controller 225 substantially similar to the network interface controller 125 described with reference to FIG. 1. Each active process list of the active process lists 105 may be received in any particular order. Each client device of the plurality of client devices 120 may submit one or more active process lists at regular intervals, when connected to a non-metered data network (e.g., Wi-Fi instead of cellular), or according to any other scheme. Each client device of the plurality of client devices 120 may submit an active process list whenever the list of active processes changes, with each of the active process lists 105 indicating a time period over which it is valid.

The analysis server 190 may comprise a plurality of components. The analysis server 190 may comprise a client data reception component 240, graph construction component 250, and graph analysis component 260. The client data reception component 240 may be generally arranged to receive the plurality of active process lists 105 from the plurality of client devices 120. The graph construction component 250 may be generally arranged to construct an active process graph for each of the plurality of client devices 120 from the plurality of active process lists received from each of the plurality of client devices 120. The graph analysis component 260 may be generally arranged to determine foreground processes and active usage statistics for the foreground processes based on the active process graphs.

The foreground application detection system 100 may include an authorization server (or other suitable component(s)) that allows users to opt in to or opt out of having their actions logged by foreground application detection system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of foreground application detection system 100 through blocking, data hashing, anonymization, or other suitable techniques as appropriate. For instance, a user may be empowered to configure privacy settings determining whether client activity, such as active processes, is logged by the foreground application detection system 100 and analyzed. In some embodiments, a user may be presented with information regarding may be collected and how that information may be used, such as informing the user that collected information may be anonymized prior to analysis. A user may be provided with the opportunity to accept or reject the logging and analysis of process activity prior to any logging and analysis of their process activity by the foreground application detection system 100.

Figure 3:
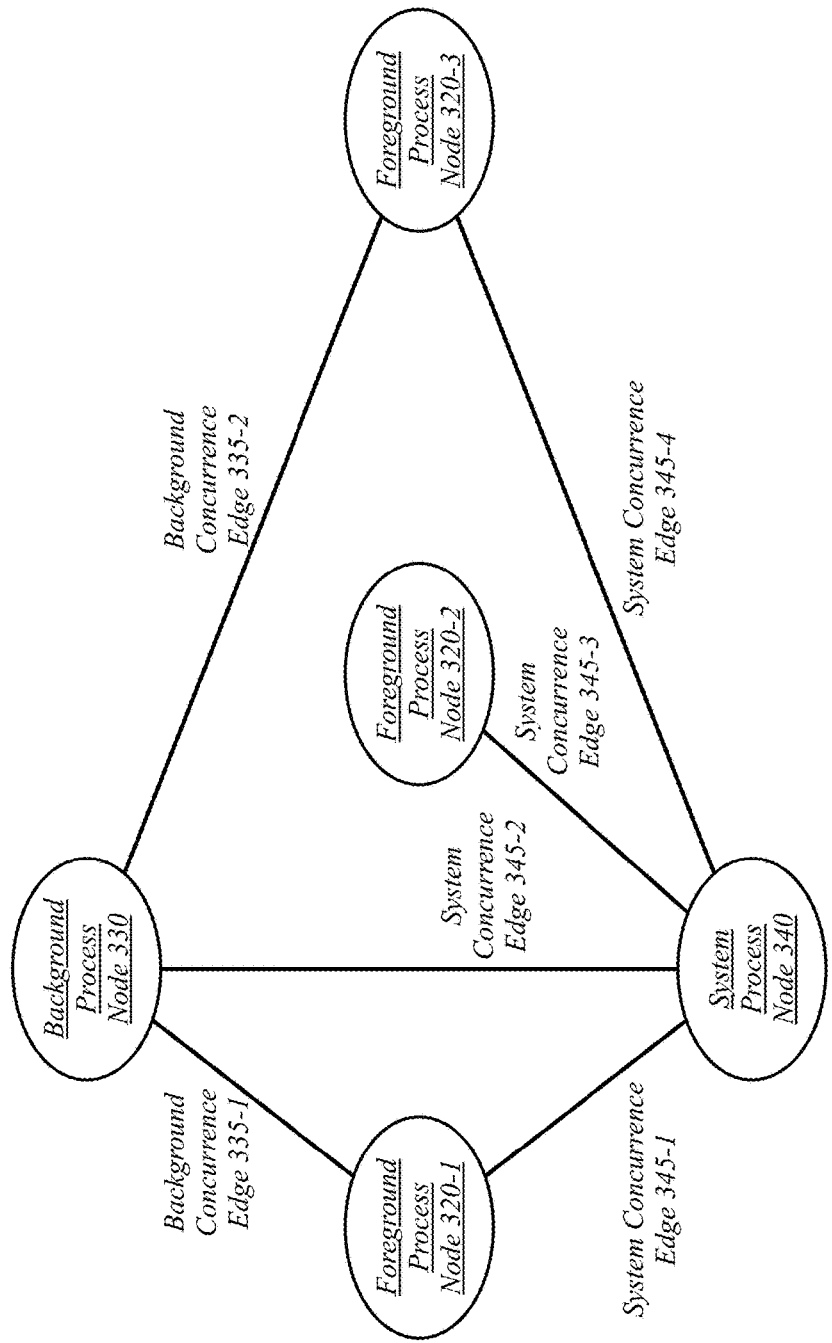
FIG. 3 illustrates an embodiment of an active process graph.

FIG. 3 illustrates an embodiment of an active process graph 300.

An active process graph 300 may represent concurrent-execution relationships for a plurality of processes on a particular client device of a defined period, such as a day or twenty-four hour period. For instance, the foreground application detection system 100 may perform a daily analysis of active process lists 105 to generate active process graphs representing twenty-four hours of process activity one each client device, then generate active foreground usage statistics based on the daily active process graphs.

Each node in an active process graph 300 may represent a particular process on a particular client device. Each edge in an active process graph 300 may represent a detected concurrent execution of a pair of processes on the particular client device. Where three or more processes are detected as having concurrent execution, this may be represented as a completely-connected sub-graph within the active process graph 300 in which each pair of the concurrently-executing three-or-more processes is connected with an edge.

Some portion of the processes may comprise system processes, such as correspond to system process node 340. A system process may be identified on the basis of it continuously executing on a client device. As the monitoring of the client device may be periodic, it may be impractical to determine whether a process actually executes continuously. As such, continuous execution may be inferred from the process being in every active process list. As a result, continuous execution may be inferred from the process being connected to every other node in the active process graph 300. The foreground application detection system 100 may therefore identify a system process node 340 based on the system process node 340 being connected to every other node in the active process graph 300. The foreground application detection system 100 may determine one or more system process nodes and remove them from consideration as foreground processes, such as by removing them from the active process graph 300.

Another portion of the processes may comprise background processes, such as correspond to background process node 330. A background process may be identified on the basis of it having a higher measured prevalence of executing concurrently with other processes. As such, the degree of each non-system node—each node after the removal of system process nodes from consideration—may be determined. Within a particular active process graph 300, background processes may correspond to process nodes with a higher degree.

The foreground application detection system 100 may compare a plurality of active process graphs from a plurality of client devices 120 to determine background processes. Each non-system process may be assigned a concurrence score representing the proportion of the occurrences of each process that are concurrent with another process across all of the active process graphs. For a given active process graph 300, each pair of connected nodes may then be categorized into a foreground process and a background process by assigning as the foreground process the process that is concurrent with another process less often than the other of the pair. The processes that are concurrent with another process more often than the other of a connected pair may therefore be removed from consideration as foreground processes. The remaining processes in consideration may then all be unconnected, as each connected pair in the active process graph 300 will have one node as being removed from consideration. The remaining nodes in the active process graph 300 may therefore correspond to the foreground process nodes 320 for that active progress graph 300.

Each process corresponding to a foreground process node 320 may therefore be registered as having been active on the respective client device. Each node in the active process graph 300 may be associated with a total daily runtime for that process, as received via the active process lists from that client device, and used to determine total daily runtime for that process on that client device. Alternatively, a registry for the processes executing on a particular client device may be maintained and used to determine the total daily runtime for that process. Additional statistics may also be generated, such as the number of instantiations per day, the durations of each use, the average length of use, and other statistics, without limitation. Each process may be associated with a particular application, with the statistics for each process recorded as corresponding to usage statistics for each application.

In general, a given client device at a particular point in time will be determined as having only one active foreground process. However, active process lists may be collected over a period of time, a measurement period, for a particular client device with all of the active process lists for the measurement period processed by an analysis server 190 in a batch. Similarly, active process lists 105 may be collected for a plurality of client devices 120 and analyzed as a batch by the analysis server 190. As such, the analysis server 190 may determine a plurality of foreground processes during its analysis, despite each individual client device being associated with only a single foreground process at any given point in time, with the detected execution of the plurality of foreground processes distinguishable according to at least one of client device and time of foreground execution. Each of the plurality of client devices may be associated with a foreground process timeline, the foreground process timeline representing each of the periods of time, such as a start time, stop time, and/or duration, for each foreground process executed by each client device, with the foreground process timelines indicating at most one process as being in the foreground at any point in time.

In the illustrated embodiment of FIG. 3, the active process graph 300 comprises process nodes for all of the processes detected during a measurement period and concurrency edges corresponding to all of the concurrent execution detections detected during the measurement period. As such, in these embodiments, each client device may only be associated with a single active process graph for a measurement period. However, in other embodiments, a distinct active process graph may be created for each distinct set of detected processes or for each continuous duration of the same set of detect processes. As such, in these embodiments, each client device may be associated with a plurality of active processes graphs for a measurement period. In the former embodiments, multiple foreground process nodes 320 may be found in a single active process graph. In the latter embodiments, only a single foreground process node may be found in a single active process graph, with the plurality of foreground processes detected for a client device in a measurement period being determined by multiple active process graphs.

Figure 4:
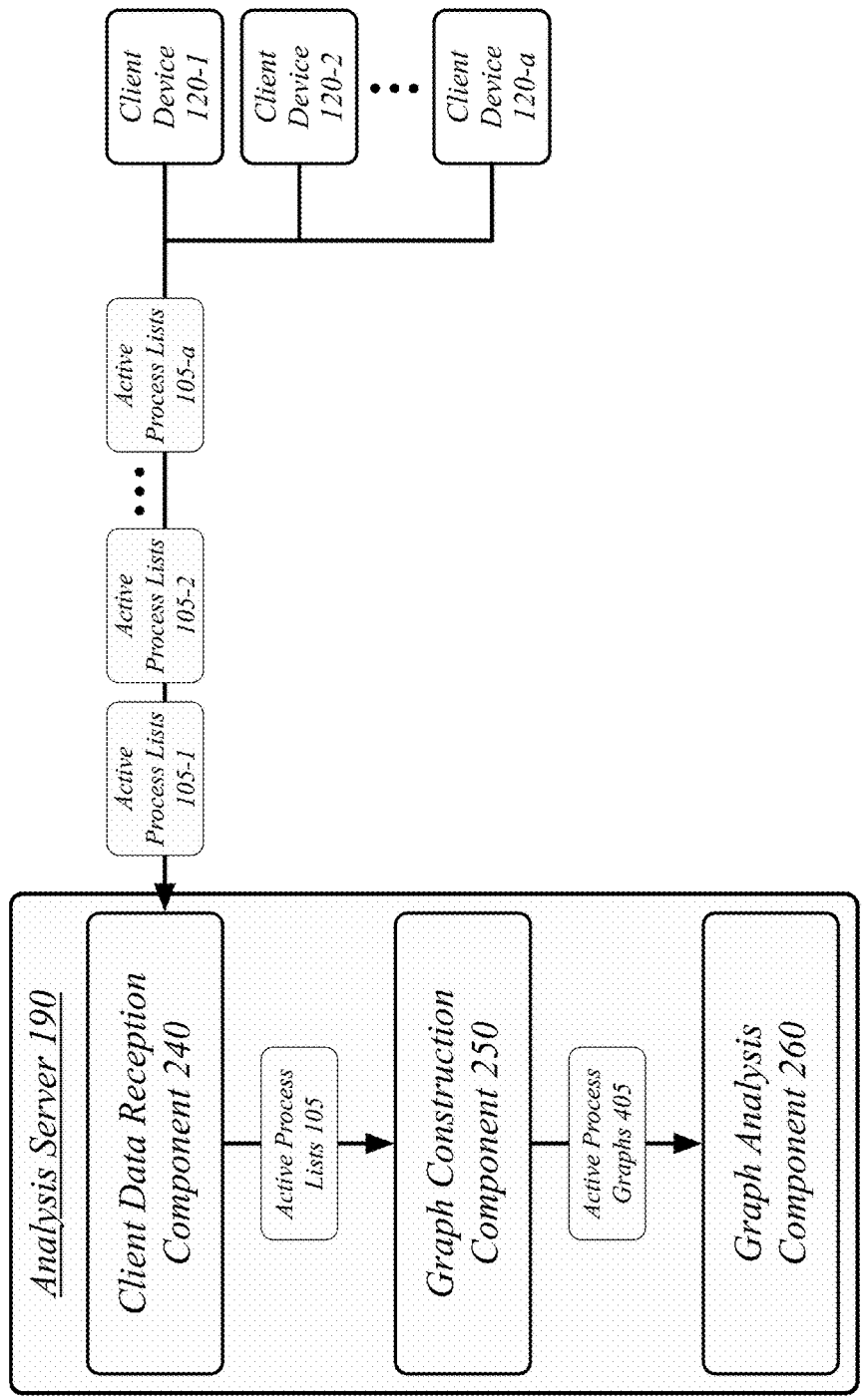
FIG. 4 illustrates an embodiment of active process graphs being generated and analyzed.

FIG. 4 illustrates an embodiment of active process graphs 405 being generated and analyzed.

The client data reception component 240 may be operative to receive a series of active process lists 105 from a plurality of client devices 120. The graph construction component 250 may be operative to construct a plurality of active process graphs 405 based on the active process lists. Each client device may be associated with a single active process graph. Each node in each of the plurality of active process graphs may correspond to an active process on an associated client device. Each pair of connected nodes in each graph may correspond to a concurrence of an associated pair of active processes on an associated client device.

The graph analysis component 260 may be operative to determine foreground processes based on the constructed active process graphs 405. The graph analysis component 260 may further generate active usage statistics based on the determined foreground processes. The active usage statistics may comprise a plurality of foreground process timelines for each of the plurality of client devices.

In various cases, statistics may be generated about the use prevalence, use preferences, and other implications of the foreground activity of applications on client devices 120. Statistics may be generated about applications usage within a specified time period (e.g., hourly, daily, weekly, monthly), such as the percentage of total users using a particular application within a monitored time period. For example, daily usage patterns may be generated for a plurality of applications based on the one or more applications having been identified as executing as foreground processes.

Related statistics may be generated, such as patterns reflecting how application usage changes at different time periods: whether an application is typically used more or less at a particular time of day, whether an application is typically used more or less at a particular day of the week, etc. These statistics may be generated on a general basis across all users of the application. These statistics may also be generated as specific to particular client devices. For instance, one user may be identified as using a particular application primarily during mid-afternoon with another user identified as using that particular application in the evening. In addition, any known type of pattern may be extracted from the logged data. These patterns may be applied in various ways, such as for match-making multi-player games based the time of day in which a user is most active in a game application, targeting ads based on similarities in application usage patterns, and according to any other known technique for targeting users based on identified patterns.

In some embodiments, background activity statistics may be generated for background processes. In general, any statistics generated for foreground processes may also be generated for background processes. In particular, statistics may be generated regarding the amount of time, frequency, and other measures of how often an application executes as a background process.

The graph analysis component may determine one or more system processes based on identifying completely-connected nodes in the plurality of active process graphs and determine foreground processes based on eliminating the one or more system processes from the active process lists 105. Alternatively or additionally, the graph analysis component 260 may determine one or more background service processes based on identifying concurrent processes with a higher prevalence of concurrence with at least one other process and determine foreground processes based on eliminating the one or more background service processes from the active process lists 105.

Determining background processes may include calculating a concurrence score for each process, the concurrence score generated based on the cumulative information of the plurality of active process lists 105. The graph analysis component 260 may calculate a concurrence score for each process based on a ratio between concurrence of each process with at least one other process as compared to occurrence of each process within the plurality of active process graphs. The graph analysis component 260 may determine one or more background service processes based on identifying concurrent processes with a higher concurrence score than processes with which the concurrent processes are concurrent. The graph analysis component 260 may then determine foreground processes based on eliminating the one or more background service processes from the active process lists.

Alternatively or additionally, an operating system's out-of-memory procedures may be used to determine background processes. An operating system may be queried to retrieve an out-of-memory score indicating whether the device is running out of memory for the storage of active processes. When the device runs out of memory, or comes close to running out of memory, the operating system may kill one or more processes. The operating system may preferentially kill background service processes rather than system processes or the foreground process. As such, a process killed due to an out-of-memory condition may be identified as a background non-system process and removed from consideration as a foreground process.

System process and background process elimination may be used in combination. The graph analysis component 260 may determine one or more system processes based on identifying completely-connected nodes in the plurality of active process graphs. The graph analysis component 260 may calculate a concurrence score for each process based on a ratio between concurrence of each process with at least one other process as compared to occurrence of each process within the plurality of active process graphs. The graph analysis component 260 may determine one or more background service processes based on identifying concurrent processes with a higher concurrence score than processes with which the concurrent processes are concurrent. The graph analysis component 260 may then determine foreground processes based on eliminating the one or more system processes and the one or more background service processes from the active process lists.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a series of active process lists from a plurality of client devices at a server device at block 502.

The logic flow 500 may construct a plurality of active process graphs based on the active process lists, wherein each client device is associated with a single active process graph, wherein each node in each of the plurality of active process graphs corresponds to an active process on an associated client device, wherein each pair of connected nodes in each graph corresponds to a concurrence of an associated pair of active processes on an associated client device at block 504.

The logic flow 500 may determine one or more system processes based on identifying completely-connected nodes in the plurality of active process graphs at block 506.

The logic flow 500 may calculate a concurrence score for each process based on a ratio between concurrence of each process with at least one other process as compared to occurrence of each process within the plurality of active process graphs at block 508.

The logic flow 500 may determine one or more background service processes based on identifying concurrent processes with a higher concurrence score than processes with which the concurrent processes are concurrent at block 510.

The logic flow 500 may determine foreground processes based on eliminating the one or more system processes and the one or more background service processes from the active process lists at block 512.

The embodiments are not limited to this example.

Figure 6:
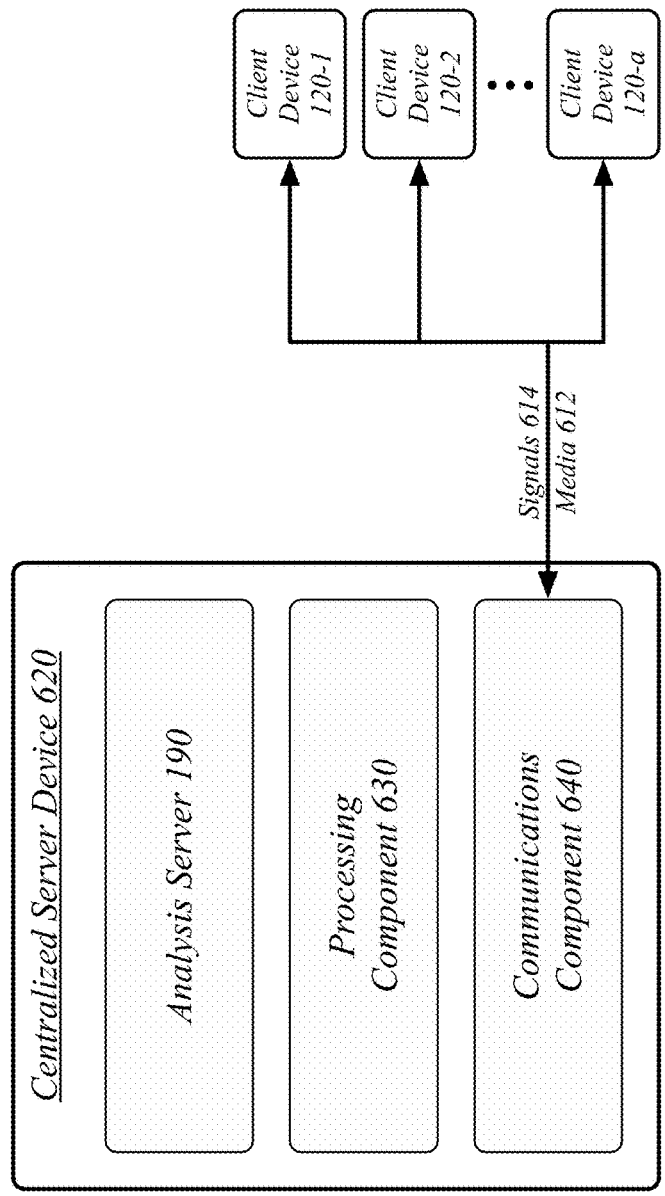
FIG. 6 illustrates an embodiment of a centralized system for the system of FIG. 1.

FIG. 6 illustrates a block diagram of a centralized system 600. The centralized system 600 may implement some or all of the structure and/or operations for the foreground application detection system 100 in a single computing entity, such as entirely within a single centralized server device 620.

The centralized server device 620 may comprise any electronic device capable of receiving, processing, and sending information for the foreground application detection system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the foreground application detection system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the foreground application detection system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may execute an analysis server 190. The centralized server device 620 may communicate with a client device over a communications media 612 using communications signals 614 via the communications component 640.

Figure 7:
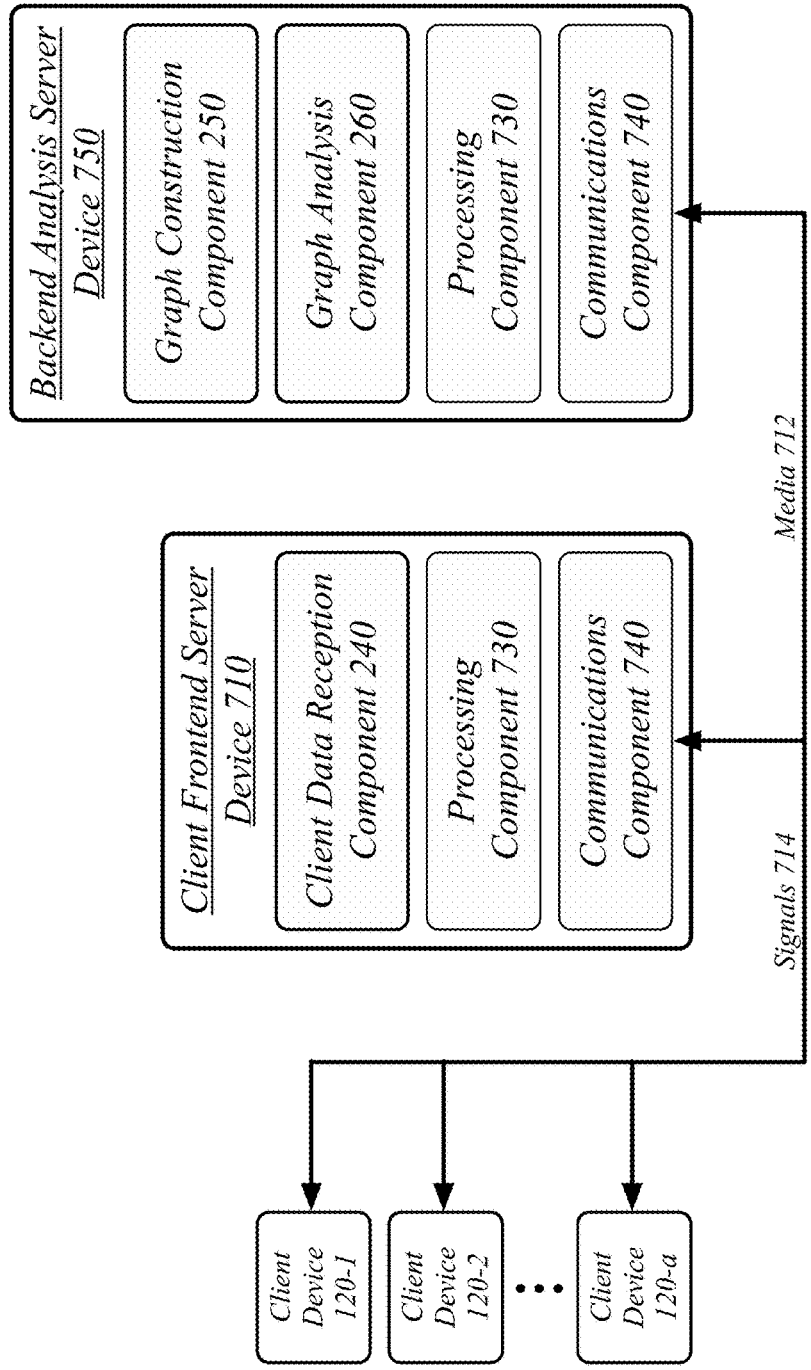
FIG. 7 illustrates an embodiment of a distributed system for the system of FIG. 1.

FIG. 7 illustrates a block diagram of a distributed system 700. The distributed system 700 may distribute portions of the structure and/or operations for the foreground application detection system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client frontend server device 710 and a backend analysis server device 750. In general, the server devices 710, 750 may be the same or similar to the centralized server device 620 as described with reference to FIG. 6. For instance, the server devices 710, 750 may each comprise a processing component 730 and a communications component 740 which are the same or similar to the processing component 630 and the communications component 640, respectively, as described with reference to FIG. 6. In another example, the server devices 710, 750 may communicate over a communications media 712 using communications signals 714 via the communications components 740.

The client frontend server device 710 may comprise or employ one or more client programs that operate to perform various methodologies in accordance with the described embodiments. In one embodiment, for example, the client frontend server device 710 may implement the client data reception component 240. The client frontend server device 710 may generally provide client access to the server systems of the foreground application detection system 100, including for the submission of active process lists 105.

The backend analysis server device 750 may comprise or employ one or more server programs that operate to perform various methodologies in accordance with the described embodiments. In one embodiment, for example, the backend analysis server device 750 may implement the graph construction component 250 and the graph analysis component 260. The backend analysis serer device 750 may generally provide backend services to the server systems of the foreground application detection system 100, including the analysis of submitted active process lists 105.

Figure 8:
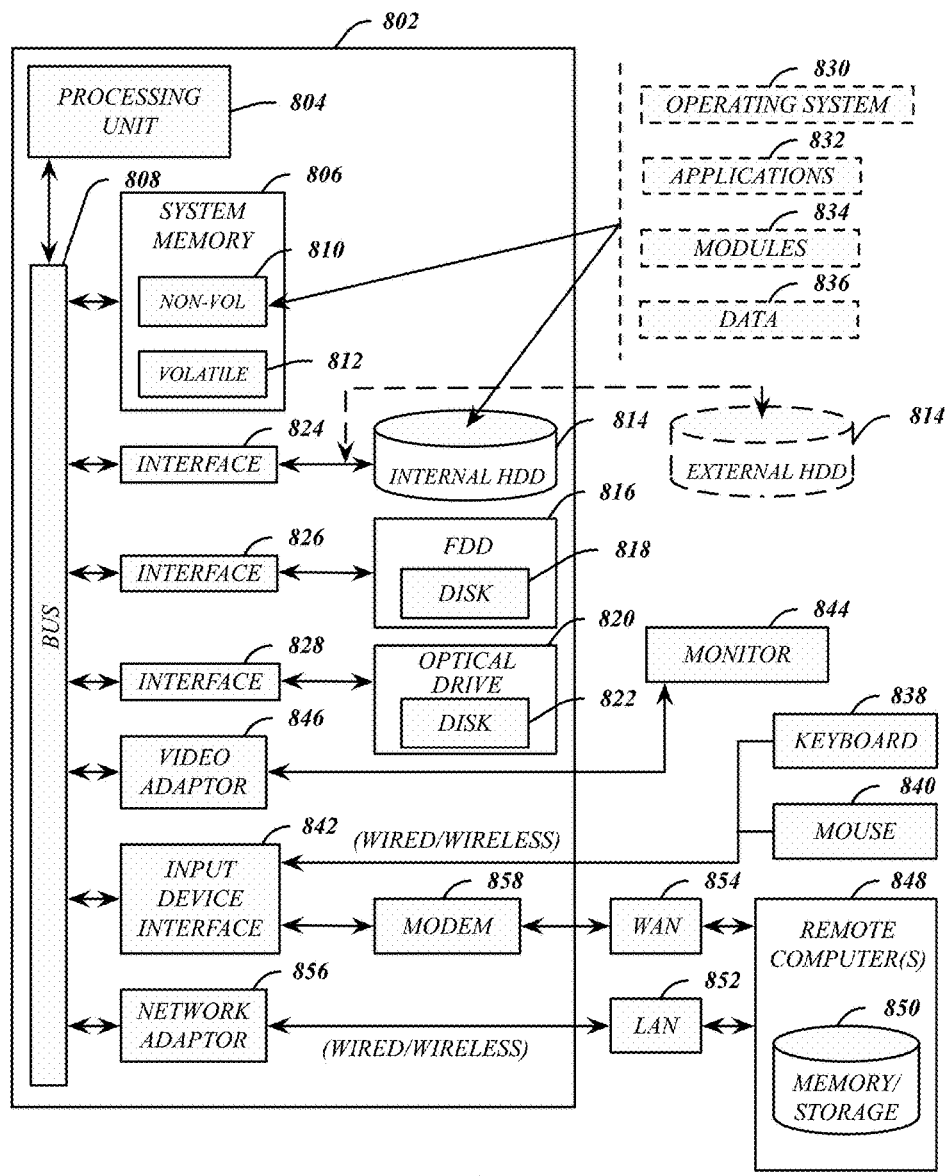
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 6, 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the foreground application detection system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
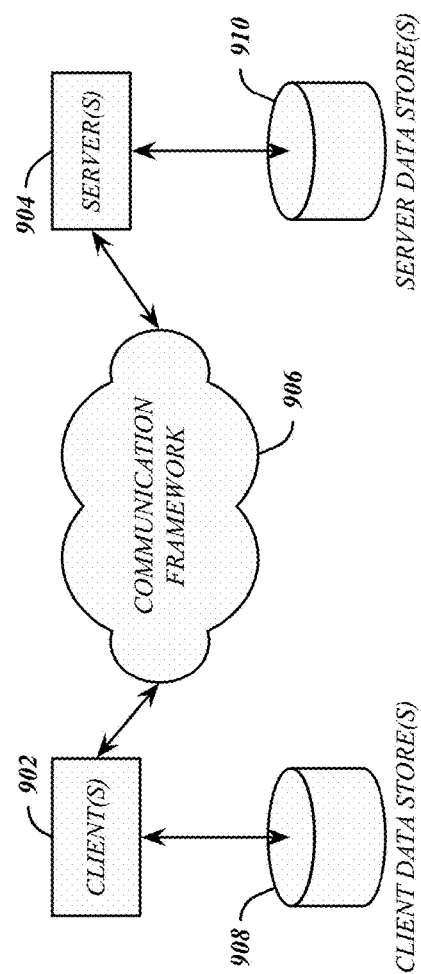
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client devices 120. The servers 904 may implement the server devices 620, 710, 750. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
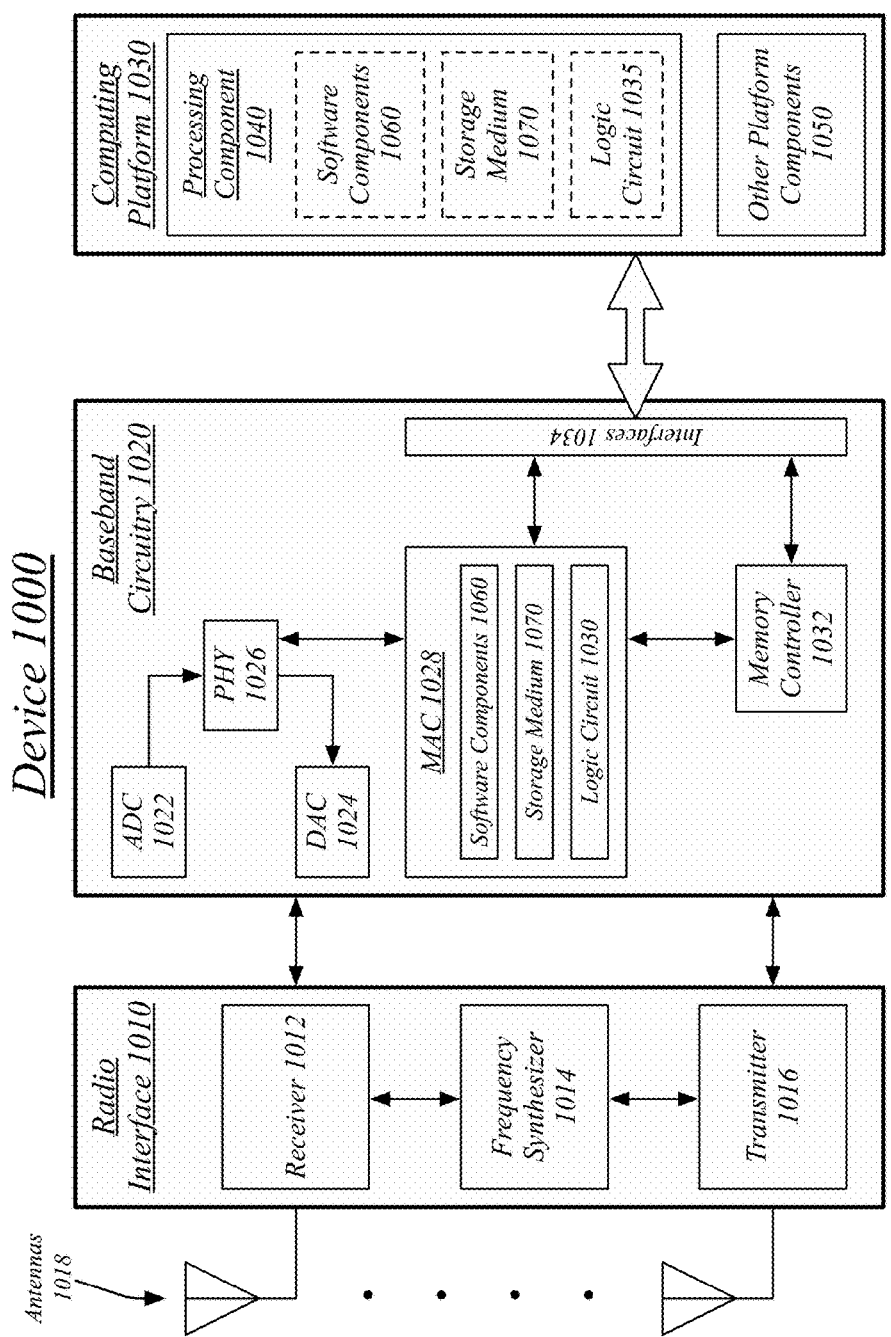
FIG. 10 illustrates an embodiment of a radio device architecture.

FIG. 10 illustrates an embodiment of a device 1000 for use in a multicarrier OFDM system, such as the foreground application detection system 100. Device 1000 may implement, for example, software components 1060 as described with reference to foreground application detection system 100 and/or a logic circuit 1035. The logic circuit 1035 may include physical circuits to perform operations described for the foreground application detection system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the foreground application detection system 100 and/or logic circuit 1035 in a single computing entity, such as entirely within a single device. Alternatively, the device 1000 may distribute portions of the structure and/or operations for the foreground application detection system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the foreground application detection system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a series of active process lists from a plurality of client devices at a server device; constructing a plurality of active process graphs based on the active process lists, wherein each client device is associated with an active process graph, wherein each node in each of the plurality of active process graphs corresponds to an active process on an associated client device, wherein each pair of connected nodes in each graph corresponds to a concurrence of an associated pair of active processes on an associated client device; and determining foreground processes based on the constructed active process graphs.

A computer-implemented method may further comprise generating active usage statistics based on the determined foreground processes.

A computer-implemented method may further comprise the active usage statistics comprising a plurality of foreground process timelines for each of the plurality of client devices.

A computer-implemented method may further comprise determining one or more system processes based on identifying completely-connected nodes in the plurality of active process graphs; and determining the foreground processes based on eliminating the one or more system processes from the active process lists.

A computer-implemented method may further comprise determining one or more background service processes based on identifying concurrent processes with a higher prevalence of concurrence with at least one other process; and determining the foreground processes based on eliminating the one or more background service processes from the active process lists.

A computer-implemented method may further comprise calculating a concurrence score for each process based on a ratio between concurrence of each process with at least one other process as compared to occurrence of each process within the plurality of active process graphs; determining one or more background service processes based on identifying concurrent processes with a higher concurrence score than processes with which the concurrent processes are concurrent; and determining the foreground processes based on eliminating the one or more background service processes from the active process lists.

A computer-implemented method may further comprise determining one or more system processes based on identifying completely-connected nodes in the plurality of active process graphs; calculating a concurrence score for each process based on a ratio between concurrence of each process with at least one other process as compared to occurrence of each process within the plurality of active process graphs; determining one or more background service processes based on identifying concurrent processes with a higher concurrence score than processes with which the concurrent processes are concurrent; and determining the foreground processes based on eliminating the one or more system processes and the one or more background service processes from the active process lists.

An apparatus may comprise a processor circuit on a server device; a network interface controller on the server device; a client data reception component operative on the processor circuit to receive a series of active process lists from a plurality of client devices via the networking interface controller on the server device; a graph construction component operative on the processor circuit to construct a plurality of active process graphs based on the active process lists, wherein each client device is associated with a single active process graph, wherein each node in each of the plurality of active process graphs corresponds to an active process on an associated client device, wherein each pair of connected nodes in each graph corresponds to a concurrence of an associated pair of active processes on an associated client device; and a graph analysis component operative on the processor circuit to determine foreground processes based on the constructed active process graphs. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a series of active process lists from a plurality of client devices at a server device;
constructing a plurality of active process graphs based on the active process lists, wherein each client device is associated with an active process graph, wherein each node in each of the plurality of active process graphs corresponds to an active process on an associated client device, wherein each node in each graph is connected to all other nodes in the graph that represent concurrently executing processes on the associated client device; and
determining foreground processes based on the constructed active process graphs.

2. The method of claim 1, further comprising:
generating active usage statistics based on the determined foreground processes.

3. The method of claim 2, the active usage statistics comprising a plurality of foreground process timelines for each of the plurality of client devices.

4. The method of claim 1, further comprising:
determining one or more system processes based on identifying completely-connected nodes in the plurality of active process graphs; and
determining the foreground processes based on eliminating the one or more system processes from the active process lists.

5. The method of claim 1, further comprising:
determining one or more background service processes based on identifying concurrent processes with a higher prevalence of concurrent execution with at least one other process; and
determining the foreground processes based on eliminating the one or more background service processes from the active process lists.

6. The method of claim 1, further comprising:
calculating a concurrence score for each process based on a ratio between concurrence of each process with at least one other process as compared to occurrence of each process within the plurality of active process graphs;
determining one or more background service processes based on identifying concurrent processes with a higher concurrence score than processes with which the concurrent processes are concurrent; and
determining the foreground processes based on eliminating the one or more background service processes from the active process lists.

7. The method of claim 1, further comprising:
determining one or more system processes based on identifying completely-connected nodes in the plurality of active process graphs;
calculating a concurrence score for each process based on a ratio between a concurrent execution of each process with at least one other process as compared to occurrence of each process within the plurality of active process graphs;
determining one or more background service processes based on identifying concurrently executing processes with a higher concurrence score than processes with which the concurrent processes are concurrent; and
determining the foreground processes based on eliminating the one or more system processes and the one or more background service processes from the active process lists.

8. An apparatus, comprising:
a processor circuit on a server device;
a network interface controller on the server device;
a client data reception component operative on the processor circuit to receive a series of active process lists from a plurality of client devices via the networking interface controller on the server device;
a graph construction component operative on the processor circuit to construct a plurality of active process graphs based on the active process lists, wherein each client device is associated with an active process graph, wherein each node in each of the plurality of active process graphs corresponds to an active process on an associated client device, and wherein each node in each graph is connected to all other nodes in the graph that represent concurrently executing processes on the associated client device; and
a graph analysis component operative on the processor circuit to determine foreground processes based on the constructed active process graphs.

9. The apparatus of claim 8, further comprising:
generate active usage statistics based on the determined foreground processes.

10. The apparatus of claim 9, the active usage statistics comprising a plurality of foreground process timelines for each of the plurality of client devices.

11. The apparatus of claim 8, further comprising:
the graph analysis component operative to determine one or more system processes based on identifying completely-connected nodes in the plurality of active process graphs; and determine the foreground processes based on eliminating the one or more system processes from the active process lists.

12. The apparatus of claim 8, further comprising:
the graph analysis component operative to determine one or more background service processes based on identifying concurrent processes with a higher prevalence of concurrent execution with at least one other process; and determine the foreground processes based on eliminating the one or more background service processes from the active process lists.

13. The apparatus of claim 8, further comprising:
the graph analysis component operative to calculate a concurrence score for each process based on a ratio between a concurrent execution of each process with at least one other process as compared to occurrence of each process within the plurality of active process graphs; determine one or more background service processes based on identifying concurrently executing processes with a higher concurrence score than processes with which the concurrent processes are concurrent; and determine the foreground processes based on eliminating the one or more background service processes from the active process lists.

14. The apparatus of claim 8, further comprising:

the graph analysis component operative to determine one or more system processes based on identifying completely-connected nodes in the plurality of active process graphs; calculate a concurrence score for each process based on a ratio between a current execution of each process with at least one other process as compared to occurrence of each process within the plurality of active process graphs; determine one or more background service processes based on identifying concurrently executing processes with a higher concurrence score than processes with which the concurrent processes are concurrent; and determine the foreground processes based on eliminating the one or more system processes and the one or more background service processes from the active process lists.

15. At least non-transitory one computer-readable storage medium comprising instructions that, when executed, cause a system to:

receive a series of active process lists from a plurality of client devices at a server device;

construct a plurality of active process graphs based on the active process lists, wherein each client device is associated with an active process graph, wherein each node in each of the plurality of active process graphs corresponds to an active process on an associated client device, and wherein each node in each graph is connected to all other nodes in the graph that represent concurrently executing processes on the associated client device; and determine foreground processes based on the constructed active process graphs.

16. The non-transitory computer-readable storage medium of claim 15, comprising further instructions that, when executed, cause a system to:

generate active usage statistics based on the determined foreground processes.

17. The non-transitory computer-readable storage medium of claim 15, comprising further instructions that, when executed, cause a system to:

determine one or more system processes based on identifying completely-connected nodes in the plurality of active process graphs; and determine the foreground processes based on eliminating the one or more system processes from the active process lists.

18. The non-transitory computer-readable storage medium of claim 15, comprising further instructions that, when executed, cause a system to:

determine one or more background service processes based on identifying concurrently executing processes with a higher prevalence of concurrence with at least one other process; and determine the foreground processes based on eliminating the one or more background service processes from the active process lists.

19. The non-transitory computer-readable storage medium of claim 15, comprising further instructions that, when executed, cause a system to:

calculate a concurrence score for each process based on a ratio between a concurrent execution of each process with at least one other process as compared to occurrence of each process within the plurality of active process graphs;

determine one or more background service processes based on identifying concurrent processes with a higher concurrence score than processes with which the concurrent processes are concurrent; and determine the foreground processes based on eliminating the one or more background service processes from the active process lists.

20. The non-transitory computer-readable storage medium of claim 15, comprising further instructions that, when executed, cause a system to:

determine one or more system processes based on identifying completely-connected nodes in the plurality of active process graphs;

calculate a concurrence score for each process based on a ratio between a concurrent execution of each process with at least one other process as compared to occurrence of each process within the plurality of active process graphs;

determine one or more background service processes based on identifying concurrent processes with a higher concurrence score than processes with which the concurrent processes are concurrent; and determine the foreground processes based on eliminating the one or more system processes and the one or more background service processes from the active process lists.

* * * * *